No. 789,609. PATENTED MAY 9, 1905.
D. A. HOLMES, S. A. TUCKER & E. VAN WAGENEN.
ARC ELECTRODE.
APPLICATION FILED AUG. 6, 1904.
Carbide and Binding Material.
WITNESSES:
Geo. P. Kingsbury.
Walton Harrison
INVENTORS
Duncan A. Holmes
Samuel A. Tucker
Edward Van Wagenen
BY
ATTORNEYS No. 789,609. Patented May 9, 1905.

UNITED STATES PATENT OFFICE.

DUNCAN A. HOLMES, SAMUEL A. TUCKER, AND EDWARD VAN WAGENEN, OF NEW YORK, N. Y.

ARC-ELECTRODE.

SPECIFICATION forming part of Letters Patent No. 789,609, dated May 9, 1905.

Application filed August 6, 1904. Serial No. 219,793.

*To all whom it may concern:*

Be it known that we, DUNCAN A. HOLMES, SAMUEL A. TUCKER, and EDWARD VAN WAGENEN, citizens of the United States, and residents of the city of New York, borough of Manhattan, in the county and State of New York, have invented a new and Improved Arc-Electrode, of which the following is a full, clear, and exact description.

Our invention relates to electrodes used more particularly for arc-lighting; and it consists of a composition of matter from which the arc-electrodes are formed.

The shape of the arc-electrode forms no part of the invention. If desired, therefore, it may have the ordinary form, such as is shown in the accompanying drawing, forming a part of this specification.

The composition used for the purpose of forming the electrode contains zirconium carbid, mixed with any desired percentage of a binding material, such as coal-tar, lamp-black, molasses, &c.

The zirconium carbid is usually manufactured in an electric furnace and is prepared from the mineral zircon admixed with an excess of carbon. As the preparation is made at a very high temperature, the silicon from the zircon is distilled off, leaving the zirconium and carbon to form the desired carbid. The method of manufacturing the compound mentioned, however, has but little to do with our invention and is mentioned in connection with the fact that the compound thus formed having been made at a comparatively high temperature is of great stability and is not easily broken up or even volatilized by the application of heat except at exceedingly high temperatures.

We find that electrodes made of the compound above mentioned give a light of unusual intensity, and the light appears to proceed from the flame of the arc—that is, from the portion intermediate of the electrode-tips—rather than from the crater of the positive electrode and the peak of the negative electrode.

The arc from our electrode may be drawn out to a relatively greater length, depending upon the voltage and current employed, and it is extinguished with a notable snap or report when the current is broken.

Our theory as to the increased efficiency is that the refractory substance used is neither decomposed nor volatilized by heating except at high temperatures, and as a consequence the material particles thrown off into the flame of the arc and before being decomposed are raised to a high degree of incandescence. The exact action going on in the arc, however, is unknown, and we wish it to be understood that our claim is not to be limited by any fallacy in the alleged cause of the action described. Whatever may be the ultimate nature of the action of arc-lights in general, and of ours in particular, the fact remains that the substance mentioned produces a light of exceptional brilliance when compared with arc-lights of other kinds which are subjected to the same conditions of temperature, (or voltage and current.)

We have also discovered that if infusible substances are added to the composition of the electrodes the small material particles in the arc are raised to a higher degree of incandescence than usual, and hence the efficiency of the light is increased, and this applies particularly to our electrode herein described, as the composition is so chosen that the maximum luminosity is thus obtained.

Having thus described our invention, we claim as new and desire to secure by Letters Patent—

An arc-electrode consisting of zirconium carbid (ZrC) admixed with a suitable binding material.

In testimony whereof we have signed our names to this specification in the presence of the subscribing witnesses.

DUNCAN A. HOLMES.
SAMUEL A. TUCKER.
EDWARD VAN WAGENEN.

Witnesses as to signature of Duncan A. Holmes:
DANIEL W. BEDFORD,
WILLIAM M. NAUGHTON.

Witnesses as to signature of Samuel A. Tucker:
J. F. STETSON,
T. J. FRENCH.

Subscribing witnesses to the signature of Edward Van Wagenen:
WM. H. REES,
JOHN P. BEZENAH.